United States Patent [19]

Majidzadeh et al.

[11] 4,047,967
[45] Sept. 13, 1977

[54] CONCRETE COMPOSITION

[75] Inventors: Kamran Majidzadeh, Worthington; Hani R. Guirguis, Upper Arlington, both of Ohio

[73] Assignee: Dampocrete Incorporated, Amesbury, Mass.

[21] Appl. No.: 769,327

[22] Filed: Feb. 16, 1977

Related U.S. Application Data

[63] Continuation-in-part of Ser. No. 648,482, Jan. 12, 1976, abandoned, which is a continuation of Ser. No. 502,221, Aug. 30, 1974, abandoned.

[51] Int. Cl.$^2$ .................................... C04B 7/35
[52] U.S. Cl. .......................... 106/90; 106/95; 106/97; 106/107; 106/111; 106/117; 106/119
[58] Field of Search ................ 106/90, 94, 95, 97, 106/98, 107, 111, 117, 119; 260/29.6 S, 29.6 PS, 29.7, 42.13

[56] References Cited

U.S. PATENT DOCUMENTS

| | | | |
|---|---|---|---|
| 2,491,487 | 12/1949 | Faulwetter | 106/94 |
| 2,564,619 | 8/1951 | Anderson | 106/98 |
| 3,021,291 | 2/1962 | Thiessen | 260/29.6 S |
| 3,711,431 | 1/1973 | Vargiu et al. | 260/29.6 S |
| 3,733,285 | 5/1973 | Steffy | 260/29.6 S |
| 3,847,630 | 11/1974 | Compernass | 106/90 |
| 3,869,295 | 3/1975 | Bowles et al. | 106/90 |
| 3,869,415 | 3/1975 | Williams | 106/94 |

*Primary Examiner* — J. Poer
*Attorney, Agent, or Firm* — Kenway & Jenney

[57] ABSTRACT

A curable concrete composition suitable for forming concrete having a high damping capacity is formed from sand, gravel, cement, and vegetable gum particles. In one embodiment, the vegetable gum particles are coated with a water based and/or water dispersable resin and a curing agent for the resin. In this embodiment, the relative concentration of resin and curing agents is controlled to cause substantially complete curing of the resin within about the same time necessary to substantially completely cure the concrete formed from the composition. In a second embodiment, an emulsion of vegetable gum is substituted for the solid vegetable gum particles.

45 Claims, No Drawings

CONCRETE COMPOSITION

REFERENCE TO RELATED APPLICATIONS

This application is a continuation-in-part of application Ser. No. 648,482, filed Jan. 12, 1976, now abandoned which was a continuation of application Ser. No. 502,221, filed Aug. 30, 1974, now abandoned.

BACKGROUND OF THE INVENTION

This invention relates to a composition suitable for forming concrete having a high damping capacity, to the concrete products produced therefrom, and to a process for forming concrete.

Prior to the present invention, a wide variety of cement based compositions containing particles formed from natural and synthetic polymer compositions have been prepared. Such polymer compositions were added in the hope of improving the mechanical characteristics of the concrete, especially loading and damping characteristics. Unfortunately, these compositions have been less than successful because the polymer particles seriously reduced the strength of the concrete composition. Furthermore, such polymers often failed to be distributed homogeneously and as a result, the cured concrete had weak spots where the polymer particles were present in high concentration. Also, the polymer particles tended to work themselves out of the concrete as it was subjected to stress over an extended period, thus further weakening the concrete.

Currently, standard concrete compositions have a water/cement weight ratio of about 0.45 to 0.50. This ratio optimizes the workability of the composition so that homogeneous mixtures can be obtained. Increased amounts of water further improve workability, but the structural strength of the resulting hardened concrete is correspondingly reduced.

SUMMARY OF THE INVENTION

In one aspect, the invention comprises concrete compositions and hardened concretes wherein, of the total weight, 2 to 15 percent, and preferably 3 to 6 percent, comprises a vegetable gum. Stated differently, 5 to 100%, and preferably 20 to 50%, of the total volume of sand normally used is replaced by vegetable gum. In one embodiment, the solid vegetable gum is coated with a water dispersible and/or water based curable resin composition. These compositions are formed by first coating solid, preformed vegetable gum particles having a size calculated to promote homogeneous dispersion, generally from about 5 microns to 0.25 inches, with a water dispersible and/or water based resin mixed with a curing agent for the resin. Prior to being mixed with the gum particles, the resin and curing agent are diluted with water, and the relative concentration of the resin and curing agent is adjusted to set the time of substantially complete curing to between about 40 minutes and 2 hours, i.e., to effect simultaneous hardening of the cement and curing of the resin.

When the curing time is so regulated, adequate time is provided to coat the gum particles with the resin and curing agent, and to permit subsequent admixture thereof with the other ingredients of the composition. The resulting cured concrete contains homogeneously dispersed gum particles. Typically, the gum will be present within the range of 100–200 pounds per cubic yard of finished concrete. However, the operable range is 25-500 lb/yd³.

According to another aspect of the invention, it has been discovered that a "liquid gum," that is, a dispersion of vegetable gum in a resinous polymeric liquid, may be used in place of the solid gum. The cured concrete produced using this material exhibits properties similar to the above-disclosed composition. Latex may be added to this dispersion to increase its workability and to further reduce the hardness and improve the damping characteristics of the cured concrete.

A primary object of the invention is the production of a concrete composition having excellent damping characteristics as well as an adequate structural and flexural strength of at least 500 psi, and an unconfined compressive strength of 2500 to 5000 psi at 28 days.

Another object of the invention is to provide an easily worked concrete composition which is curable to form concrete containing homogeneously dispersed vegetable gum particles.

Still another object of the invention is to provide a concrete which meets current standards of strength, i.e., a concrete having a compressive strength of from 2500 to 6000 psi and a flexural stength of 400 to 800 psi.

Yet another object of the invention is to provide a vibration-absorbing concrete suitable for forming vibration limiting structures and surfaces for tennis courts, playgrounds, and the like.

Other objects and features of the invention will be apparent to those skilled in the art from the following description of some preferred embodiments.

DESCRIPTION OF THE PREFERRED EMBODIMENTS

At the outset, certain terms are defined to facilitate understanding of the specification and claims.

The term "cement" is used in its usual sense to denote the class of structural material which is admixed with water, and thereafter hardens or sets as a result of physical or chemical changes which consume the water present. As well as portland cement, it includes but is not limited to:

1. Rapid hardening cements, as characterized by those with high alumina content;

2. Low heat cements, as characterized by high percentages of dicalcium silicate and tetracalcium alumino ferrite and low percentages of tricalcium silicate and tricalcium aluminate;

3. Sulfate resisting cements, as characterized by unusually high percentages of tricalcium silicate and dicalcium silicate and usually low percentages of tricalcium aluminate and triracalcium alumino ferrite;

4. Portland blast-furnace cements, as characterized by portland cement clinker and granulated slag;

5. Masonry cement, as characterized by mixtures of portland cement and one or more of the following: hydrated lime, granulated slag, pluverized lime, colloidal clay, diatomaceous earth or other finely divided forms of silica, calcium stearate, and paraffin;

6. Natural cements, as characterized by materials obtained from deposits in the Lehigh River Valley;

7. Lime cements, as characterized by oxides of calcium in its pure or impure forms, often containing argillaceous materials;

8. Selenitic cement as characterized by the addition of 5 to 10% of plaster of paris to lime;

9. Pozzolinic cement, as characterized by the mixture of pozzolona, trass kieselguhr, pumice, tufa, santorin earth, or granulated slag with lime mortar; and 10. Calcium sulfate cements, as characterized by those depending on the hydration of calcium sulfate and including plaster of paris, Keene's cement, and Parian cement.

The term "concrete composition" as used herein, means a curable mixture of cement and water including one or more filler materials such as sand, gravel and the polymerized solid or liquid gum of the invention.

The term "concrete" refers to a cured composition characterized by structural rigidity and hardness wherein the cement composition thereof has been hydrated.

The term "vegetable gum," as used herein, means materials derived by reacting vegetable oils with sulfur. Generally, the solid vegetable gum useful with the present invention is formed by reacting the oil with sulfur in the form of sulfur monochloride under mild heating conditions in a manner well known in the art. Representative suitable gums are polymerized corn oil, peanut oil, grapeseed oil and soy bean oil, the latter being the preferred vegetable gum.

The term "liquid vegetable gum" refers to a material formed by emulsification of vegetable gum in a suitable liquid typically using a suitable emulsifying agent. The consistency, i.e., the viscosity of the liquid gum is dependent on the quantities of vegetable gum and the liquid used.

The term "water dispersable resin" as used herein, means a hardenable resin that is water based or otherwise exhibits hydrophilic properties and can be used to coat gum particles to facilitate their dispersion in concrete compositions of the invention.

The term "filler" means sand, gravel, and resin coated vegetable gum, as well as other inert materials which may be added to conventional concrete compositions.

The term "water-cement ratio" means the ratio of the weight of the total amount of water to the weight of the cement used in a concrete composition.

According to a first aspect of the invention, a concrete composition is formed by coating pre-formed polymerized vegetable gum particles with a water dispersable resin mixed with a curing agent for the resin. The mole ratio of resin to cruing agent is regulated so that essentially complete curing of the resin is obtained simultaneously with the curing of the cement of the composition.

The invention will be described in detail with respect to water dispersable epoxy resin systems. However, it is to be understood that other water dispersable resin systems can be employed to coat the gum particles. When preparing the coated gum particles, the epoxy resin and curing agent first are mixed and the mixtures is then diluted with water in amounts between about 1.0 to 1.5% times the weight of the epoxy resin-curing agent mixture to obtain a relatively nonviscous solution or dispersion. This added water is considered when determining the total water requirement in the concrete composition. The ratio of epoxy resin and curing agent employed provides the operator with a reasonable time for mixing the coated gum particles with the other components of the concrete composition. The gum-water dispersion is then admixed with sand, gravel, cement, water, and any other normally employed concrete additives. The coated gum particles, like sand and gravel, act as a filler for the concrete composition and as a given volume of sand and (in some applications) gravel is removed, it is made up by adding a more or less equal volume of coated gum particles. Accordingly, the volume of sand and/or gravel normally employed is typically reduced in correspondence to the volume of gum particles added to the concrete composition. A volume of gum particles equal to 100% of the sand may be used. However, preferably between about 20 and 50% of the sand normally used will be replaced by vegetable gum.

It is desirable to employ as little water as possible to obtain a suitable viscosity of the resulting wet concrete composition and a suitable resin curing time. In this circumstance, working and mixing of the composition is eased, yet the flexural strength of the cured concrete will not be seriously reduced. Generally, the water-cement ration employed is about 0.37 to 0.45, i.e., equal to or less than the water-cement ratio in conventional concretes. A water-cement ratio as low as 0.37 can be achieved due to the high workability of the materials of the invention.

After the coated gum particles and other components of the concrete composition have been admixed, the cement is allowed to set and harden to form concrete in the usual manner. Generally, the cement sets in a few hours and gradually gains strength with time. A seven day setting period generally produces about 70% of the maximum long term strength value. The epoxy resin, however, is substantially completely cured in about one hour.

The epoxy or other water dispersable resin used with the invention functions in two ways. First, it functions as a water dispersable coating to allow gum particles to be dispersed homogeneously in the water used and in the finally formed concrete. Second, it functions as a binder to secure the gum particles to and within the concrete as finally formed, thereby improving overall strength.

The preferred size range for the vegetable gum particles incorporated into the concrete composition and concrete of the invention is from about 5 microns to about 0.25 inch, i.e., from fine slit size to gravel size. While larger or smaller particles may be employed, particles within the above noted range enhance the ease with which a homogeneous composition is formed.

Representative suitable epoxy resins include polyglycidyl esters obtained by the reaction of di- or polycarboxylic acid with epichlorohydrin or glycerol dichlorohydrin in the presence of an alkali. Such polyglycidyl esters may be derived from aliphatic dicarboxylic acids, e.g., oxalic acid, succinic acid, sebacic acid, or dimerized or trimerized linoleic acid, and from aromatic dicarboxylic acids such as phthalic acid, isophthalic acid, terephthalic acid, naphthalene 2-6-dicarboxylic acid, diphenyl-2,2'-dicarboxylic acid, and ethylene glycol bis (4 carboxyphenyl ether). Specific polyglycidyl esters include, for example, diglycidyl phthalate, diglycidyl adipate, and those diglycidyl esters which correspond to the average formula:

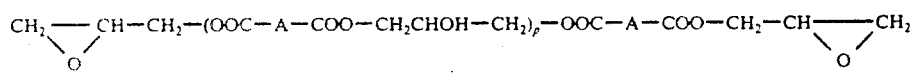

for mixing the coated gum particles with the other components of the concrete composition. The gum-water dispersion is then admixed with sand, gravel, cement, water, and any other normally employed concrete additives. The coated gum particles, like sand and gravel, in which A represents a divalent aromatic hydrocarbon radical such as a phenylene group, and $p$ represents a small whole or fractional positive number.

Other epoxide resins which may be used include polyglycid ethers, such as those obtainable by the interaction of a dihydric or polyhydric alcohol, or a dihydric or polyhydric phenol, with epichlorohydrin or a related substance (for example, glycerol dichloro hydrin) under alkaline conditions or, alternatively, in the presence of an acidic catalyst with subsequent treatment with alkali. These compounds may be derived from diols or polyols, such as ethylene glycol and polyethylene glycols, propylene glycols, and polypropylene glycols, propane-1,3-diol, butane-1,4-diol, pentane-1,5-diol, hexane-1,6-diol, hexane-2,4-6-triol, glycerol, or N-aryldialkanolaines such as N-phenyldiethanolamine, or, preferably, from dihydrin or polyhydric phenols such as resorcinol, catechol, hydroquinone, 1,4-dihydroxynaphthalene, 1,5-dihydroxynaphthalene, bis(4-hydroxyphenyl) methane, bis(4-hydroxyphenyl) methylphenylmethane, bis(4-hydroxyphenyl) sulphone, and especially, 2,2-bis(4-hydroxyphenyl)propane (Bisphenol A), or phenolformaldehyde condensation products.

There may further be employed aminopoly-epoxides, for example, such as are obtained by the dehydrohalogenation of the reaction products of epiholohydrin and primary or di-secondary amines such as aniline, a-butylamine, bis(4-aminophenyl) methane or bis(4-methylaminophenyl) methane.

Other suitable epoxide resins are those obtained by the reaction of 2,2-bis(4-hydroxyphenyl) propane with epichlorohydrin characterized by an epoxide content of about 2.0 to 5.88 epoxide equivalents per kilogram.

Representative curing agents for the epoxies include aliphatic or non-aliphatic, e.g., araliphatic, monoepoxide. Useful curing agents include, for example, a monoepoxyalkane containing 2 to 4 carbon atoms, such as ethylene oxide, propylene oxide, butylene oxide, or epichlorohydrin, or an alkyl or aryl glycidyl ether containing a total of 5 to 11 carbon atoms, such as n-butyl glycidyl ether or phenyl glycidyl ether. Preferably, propylene oxide, n-butyl glycidyl ether, or phenyl glycidyl ether is used. Alternatively, the compound may be an aliphatic compound having more than one terminal 1,2-epoxide group per average molecule for example digylcidyl ether or digylcidyl ethers of polyhydric alcohols, especially of dihydric alcohols containing from 2 to 6 carbon atoms, such as ethylene glycol ether, diethylene glycol diglycidyl ether, and propane-1,2-and propane1,3- diol diglycidyl ethers. Preferably, butane-1, 4-diol diglycidyl ether is used.

Other useful curing agents include a poly(aminoamide) derived from an alkylenepolyamine and a polymeric araliphatic acid obtained by copolymerization of a conjugated fatty acid, or a lower alkyl ester thereof, with styrene in a mole ratio between 1:0.2 and 1:5 in the substantial absence of free radical-forming catalysts and in the presence of an inhibitor for free radical catalyzed polymerization. Such poly(aminoamides) are described in British patent specification No. 988,738. Particularly perferred are the said poly (aminoamides) which have an amine value of between 85 and 435.

The aqueous dispersions preferably also contain an accelerator for the hardening action. Suitable accelerators are compounds containing at least one tertiary amine nitrogen atom and a phenolic hydroxyl group, 2,4,6-tris (dimethylaminomethyl) phenol or 2-dimethylaminomethyl-4-nonyl phenol being particularly preferred. Other accelerators may, however, be used.

When the accelerators contain groups, e.g., primary amino groups, capable of reacting with the epoxy group or groups of the epoxide compound employed to form the adduct, they should be incorporated in the aqueous dispersion after the formation of the adduct has been effected. The aqueous dispersions may further contain diluents or viscosity-reducing agents for the epoxide resins or the adduct, such as phenyl glycidyl ether, but especially a glycidyl ether of an aliphatic monohydric alcohol containing from 4 to 10 carbon atoms, such as n-butyl glycidyl ether and iso-octyl glycidyl ether, or a digylcidyl ether of an aliphatic dihydric alcohol having from 2 to 6 carbon atoms, such as butane-1,4-diol digylcidyl ether. Glycidyl ethers, employed as reactive diluents, should be incorporated in the aqueous dispersions of the present invention after the formation of the adduct has been effected. The dispersion may also contain pigments such as titanium dioxide, plasticizing agents such as polypropylene glycols, extenders such as low vixcosity coal-tar fractions, and flow-control agents. They may also contain, as an adhesion promoter, a silane containing reactive group, especially 3-(glycidoxy) propyltrimethoxysilane.

These water based systems are produced commercially and known by tradenames such as: Epon 828, available from Shell Chemical Co., Hydroepoxy, available from Allied Chemicals Corp., 331, emulsion-water epoxy, commercially available from Dow Chemical Co. or General Mills Corp., or "Polyox" available from Union Carbide Corporation. A suitable commercially available hardner is Versamid X265 WR70, available from General Mills Corp. Generally, the epoxy to curing agent mole ratio is maintained at about 1 to 1.

Other suitable water miscible resins are polyurethanes derived from w polyol and a polyisocyanate. The polyols suitable for making the prepolymer component of the compositions of this invention should have molecular weights between 300 and 2,300. Compositions prepared from polyols having molecular weights below 300 are too brittle. "Prepolymers" prepared from polyols having molecular weights above 2,300 are viscous or solid, difficult to disperse, dissolve or "thin" and tend to gel rapidly. The polyols may contain functional groups, other than hydroxyl groups, which are capable of reacting with isocyanate groups, e.g., carboxyl groups, mercapto groups, primary or secondary amino groups, urethane linkages (which contain reactive hydrogen bonded to nitrogen) etc. However, the reactive hydrogen bearing groups in the polyol should be predominantly hydroxyl groups. Suitable polyols include the following:

1. Castor oil and other glyceride esters of hydroxylated fatty acids. Caster oil is the preferred polyol. Related materials which are operative include hydrogenated caster oil, glycerine monoricinoleate, glycerin diricinoleate, and the blown drying oils, also referred to "heavy bodied" oils, such as blown soya, tung, poppyseed, hemp seed, or linseed oils, and partial esters of glycerine with "blown" drying oil fatty acids.

2. Polyester-polyols prepared by copolymerizing low molecular weight polyols and polycarboxylic acids. These materials are prepared by reacting a mixture containing the polycarboxylic acids and polyols in proportions such that a stoichiometric excess of polyol is present to insure that the resulting polyester will have a preponderance of terminal hydroxyl groups over terminal carboxyl groups. Preferably the low molecular weight polyols are predominantly diols, e.g., mono-, di- or triethylene or propylene glycols, 1,4-butanediol, diethanolamine, amine, etc. Advantageously, a minor amount of a triol such as glycerine, hexane triol, trimethylol ethane or trimethylol propane may be included. Suitable acids include adipic, succinic, maleic, phthalic, terephthalic, etc.

3. Polyalkylene glycols such as polyethylene glycols, polypropylene glycols, or mixed polyethylene-polypropylene glycols having molecular weights between 300 and 2,300.

Polyisocyanates suitable for mixing the prepolymer include, among many others, 2,4- and 2,6-tolylene diisocyanates, diphenylmethane-4,4' diisocyanate, para and meta phenylene diisocyanate, hexamethylene diisocyanate, 3,3-bitolylene-4,4'-diisocyanate, and 1,5-naphthalene diisocyanate. The prepolymers are preferably prepared by heating a mixture of the polyol and polyisocyanate to 50°-70° C in an atmosphere of inert gas such as dry nitrogen.

Catalysts capable of accelerating the resin-forming reactions are, in general, bases. Weaker bases such as tertiary amines are preferred because stronger bases are too active. Examples are N-methyl morpholine, adipic acid diester of diethylaminoethanol, diethyl cyclohexylamine, 3-methyl isoquinoline, etc.

Some prepolymers, particularly those from high molecular weight polyester polyols, are prone to gel upon standing. This can be prevented by addition of a small amount of certain mineral acids or material reactive to liberate same, e.g., acyl halides such as acetyl chloride, benzoyl chloride, etc.

In addition, a water dispersion of polyvinyl acetate can be employed to coat the gum particles.

The coated gum particles then are added to a conventional cement composition useful for forming concrete. Such compositions normally include cement, sand, gravel, water, and optionally, standard concrete additives for air entrainment, accelerated curing, and other required characteristics. It is to be understood that the cement composition to which the coated gum particles are added is not critical to the present invention. Generally, the coated gum particles are added to replace the normally employed fillers, e.g., sand and/or gravel, on a volume basis. The relative density of the coated gum particles to sand is about 0.38. Thus 1 pound of sand is replaced by approximately 0.38 pounds of coated gum particles. Generally, the coated gum particles may comprise up to 100% of the volume of the sand normally used. As the amount of coated gum particles in the composition is increased, the density and strength of the concrete will decrease.

The foregoing embodiment of the invention is a concrete which has excellent damping characteristics in that it readily absorbs vibrations. Accordingly, this product is useful in noise and vibration limiting structures, such as machine foundations, topping floor slabs, tunnels, impact protection devices, and railroad ties. It is also useful for forming floors such as tennis courts, basketball courts, or playgrounds.

According to another aspect of the invention, it has been discovered that certain "liquid gums" may be used in place of the vegetable gums disclosed above. The liquid gum refers to an emulsion prepared from vegetable gum dispersed in a water dispersable resin aqueous mixture such as those set forth above (hereinafter referred to as a polymeric liquid). The density of the resulting liquid additive, i.e., liquid gum emulsified in polymeric liquid, should be about 8.4 or 8.5 lbs/gal. The viscosity or consistency varies depending upon the concentration of vegetable gum material. The most practical consistency for the liquid additive is one which is similar to that of milk, which enables easy placement and incorporation of liquid additive into the concrete composition. Latex emulsions may be added to increase workability and reduce the hardness of the finally formed concrete product. In general, between about 5 and 30 gallons of liquid additive may be added per cubic yard of the concrete composition, with between 10 and 25 gallons being preferred.

According to this aspect of the invention, the liquid gum, diluted with water or latex as needed to provide suitable workability, are combined, added to the other ingredients of the concrete composition, and thoroughly blended to obtain a homogeneous system. Whenever the viscosity of the liquid additive containing vegetable gum is too high for easy blending, suitable additional liquid is added to reduce the viscosity. The preferred sequency of mixing is (i) blending sand, gravel, and cement, (ii) introducing liquid additive containing the water dispersable resin, and introducing additional water or latex so that the total amount of water added is within the range set forth above.

The invention will be further understood from the following nonlimiting examples.

EXAMPLE 1

This example illustrates a method for forming the compositions of the invention and provides a comparison of the structural characteristics of the concrete of the invention with standard concrete compositions.

The gum employed was soya bean oil polymerized with sulfur monochloride. The resultant gum was ground to an average particle size ranging from 0.05 to 0.2 mm. The epoxy composition comprised a water-miscible epoxy resin and a curing agent for the epoxy. The epoxy and curing agent, after being mixed, were diluted with water (Table 1) and then added to the gum to form a film coating. The epoxy was substantially completely cured within 1 hour which was long enough to provide a reasonable time for mixing and transportation procedures.

For purposes of comparison, standard concrete was made of sand, gravel, portland air entrained cement, and water, and was tested according to ASTM standard number C78-64 and C293-68. In forming the composition of the invention, the gum replaced the fine aggregate (sand) on a volumetric basis as a filler. It was found that 1 lb. of sand is replaced by 0.383 lbs. of the epoxy-coated gum particles to produce the same volume. Two basis gum replacement ratios of 20 and 40% of the volume of the sand were chosen, i.e., 20 or 40% of the sand was removed and enough coated particles were added to make up the volume loss. The weight of the epoxy used was based on the surface area of the gum so as to form a coating film for the gum particles. The coated gum particles were then mechanically mixed for five minutes with the sand, gravel, cement, and water.

For this mixing procedure, saturated surface dry sand and gravel were used. The different cement compositions used are shown in Table 1.

TABLE I

| Mix | Mix Category | Water/Cement Weight Ratio | Weight of Cement(lbs) | Weight of Water(lbs) | Weight of Uncoated Gum(lbs) | Weight of Epoxy or Binding Agent(lbs) | Weight of Sand(lbs.) | Weight of Gravel (lbs.) |
|---|---|---|---|---|---|---|---|---|
| A | Standard | .4 | 10.54 | 4.22 | | | 15.5 | 15.62 |
| B | Standard | .37 | 10.54 | 3.90 | | | 15.5 | 15.62 |
| C | 20% coated gum | .40 | 10.54 | 4.10 | 1.15 | .13 Polyvinyl Acetate Emulsion +.13 Water | 12.4 | 15.62 |
| D | 40% coated gum | .39 | 10.54 | 3.70 | 2.30 | .2 Epoxy +.55 Water +.2 Curing Agent | 9.3 | 15.62 |
| E | 40% Coated gum | .37 | 10.54 | 3.80 | 2.30 | .4 Epoxy +1.1 Water +.4 Curing agent | 9.3 | 15.62 |

Mix Proportions For Batches to Make 3 Beams (16"×4"×3")

After the compositions set forth in Table 1 had been mixed, they were poured and compacted in steel molds to make beams 16×4×3. The beams were left to cure in the molds for 24 hours and thereafter placed in humidity rooms for periods ranging from two to four weeks.

The beams were tested simply supported with a span of 12 inches and 4 inches depth. The beams were loaded slowly at a constant rate until failure using a Tinus Olsen model 4. The flexural strength or rupture modulus R is calculated using the formula:

$$R = 6M/bd^2$$

where $M$ is the bending moment, $b$ is the beam width, and $d$ is the beam depth. In this case, $r = 3/8P$ where P is the failure load.

The test results of the concretes of Table I are set forth in Table II and show that the loss of flexural strength due to the addition of the gum is within the range of only 10 to 20%.

Each of the concrete beams set forth in Table II were tested to determine their fundamental longitudinal frequencies according to the test method of the ASTM (C215-60), section 5. By using those fundamental longitudinal frequencies and the weight and dimensions of the specimens tested, the dynamic Young's modulus of elasticity was also calculated.

The dimensional ratio of the specimens (length/maximum transverse direction = 4.0) met the limitations of 3-5 as specified in the ASTM standard. The point of resonance of the specimen was determined by observing the maximum indicator reading, but observation of nodal point characteristics was not made. Auxiliary calculations of expected values of the fundamental longitudinal frequency were used in lieu of any nodal point observations.

In order to determine the relative damping characteristics of the concrete specimens, it was necessary to apply the ½ power point technique. This method yields a value, Q, which varies inversely with the internal damping; that is, high Q indicates little damping, while a small value of Q indicates a great deal of damping. Thus, by comparing the values of Q obtained for each specimen, the relative change in damping from one specimen to the next was determined.

The value of Q is defined as:

$$Q = w_n/(3db \text{ bandwidth})$$

where $w_n$ = the natural frequency of the beam ($H_z$)

3db bandwidth = the difference between the frequency above the resonant frequency and that below resonance at which the vibrational amplitude falls 3bd below its peak value. These two points are termed the half-power points. One is at a frequency slightly below $w_n$ and the other slightly above.

In order to find the half-power points, use was made of the fact that the amplitude of vibration is directly proportional to the voltage received from the pickup transducer employed. Thus, one need calibrate a voltmeter only so that the 3db reduction in amplitude may be read directly. With such a motor, then, the half-power points were obtained as follows:

Initially, the resonant frequency of the beam was found by using an oscillator to drive the beam at frequencies roughly between 10 Hz and 12,000 Hz. The natural frequency was found by observing the frequency at which the voltage was maximum. This corresponds to the maximum vibration amplitude. In order to standardize the tests, the voltae was then changed so that the voltmeter was calibrated to read O db. It was then only necessary to decrease the frequency to the point where the voltmeter needle pointed to the −3 db point. This frequency was then recorded as the −3 db point below resonance. The driving frequency was then increased until the voltmeter needle passed through 0 b and, as the frequency was increased further, back down toward −3 db again. When this point was reached, the value of the frequency was recorded as the −3 db point above resonance. The bandwidth was then obtained as the difference between the point below resonance and that above resonance. This value then was divided into the resonant frequency to obtain Q.

As shown in Table II, the introduction of gum damping agent greatly affected the damping capacity of this new material as compared to standard concrete. The reduction in Q varies from 60% to 27% depending on the amount, shape, gradation, and size of damping agent added.

Table II
Strength and Damping Results

| Beam | Mix | Curing Time (Days) | Flexural Strength psi | Dampening Factor Q |
|---|---|---|---|---|
| S* | A | 11 | 1172 | 136 |
| S | A | 11 | 1172 | 125 |
| S | A | 7 | 1078 | 129 |
| 20% | C | 8 | 745 | 72 |
| 20% | C | 8 | 797 | 90 |
| 40% | E | 17 | 427 | 33 |
| 40% | E | 17 | 600 | — |
| 40% | E | 42 | 585 | 77 |
| 40% | E | 42 | 645 | 62 |
| 40% | E | 42 | 619 | 61 |

Table II-continued
Strength and Damping Results

| Beam | Mix | Curing Time (Days) | Flexural Strength psi | Dampening Factor Q |
|---|---|---|---|---|
| 40% | E | 42 | 683 | 80 |
| S | B | 41 | 843 | 100 |
| S | B | 41 | 790 | 92 |
| S | B | 41 | 919 | 106 |
| S | B | 41 | 885 | 110 |
| 40% | D | 39 | 900 | 72 |
| 40% | D | 39 | 776 | 66 |
| 40% | D | 39 | 747 | 66 |
| 40% | D | 39 | 765 | 72 |
| S | B | 38 | 1086 | 117 |
| S | B | 38 | 1028 | 108 |
| S | B | 38 | 1182 | 99 |
| S | B | 38 | 1200 | 96 |
| 40% | D | 27 | 727 | 69 |
| 40% | D | 27 | 750 | 58 |
| 40% | D | 27 | 655 | 68 |
| 40% | D | 27 | 788 | 62 |
| S | B | 18 | 1031 | 86 |
| S | B | 18 | 994 | 102 |
| S | B | 18 | 1039 | 99 |
| S | B | 18 | 1016 | 98 |
| 40% | E | 17 | 825 | 56 |
| 40% | E | 17 | 795 | 48 |
| 40% | E | 17 | 863 | 49 |
| 40% | E | 17 | 761 | 46 |
| 40% | E | 17 | 694 | 42 |
| 40% | E | 17 | 731 | 36 |
| 40% | E | 17 | 761 | 46 |
| 40% | E | 17 | 649 | 51 |
| 40% | E | 14 | — | 54 |
| 40% | E | 14 | — | 54 |
| 40% | E | 14 | — | 51 |
| 40% | E | 14 | — | 48 |
| 40% | E | 14 | 769 | 47 |
| 40% | E | 14 | 683 | 58 |
| 40% | E | 14 | 789 | 66 |
| 40% | E | 14 | 739 | 67 |
| S | B | 13 | 938 | 100 |
| S | B | 13 | 919 | 99 |
| S | B | 13 | 982 | 106 |
| S | B | 13 | 900 | 104 |

*S-Standard Mix
20% = 20% by weight replacement of sand by coated gum
40% = 40% by weigh replacement of sand by coated gum As shown in this example, standard concrete and the concrete composition of the invention were compared for strength, and damping capacity. Simple supported standard 16×4×3 beams were used for flexural strength and 8×1½×1½ beams for damping tests.

The results presented show that the addition of gum and the use of epoxy significantly influences the engineering properties of the composition of this invention as compared to standard concrete. The damping capacity of the gum-containing concrete when replacing 40% of the sand filler with an equal volume of the coated gum particles can be as high as three times the values of standard concrete. A typical ratio of damping would be almost twice that of standard concrete. This is attributed to the low value of water/cement ratio used which is easily attained because of the excellent mix workability due to the addition of the damping agent. The damping and strength values can cover a certain range depending on the ratio, shape, size, and gradation of gum and the amount of binding agent used.

It is apparent that the gum-containing concrete of the invention is very useful when high damping concretes are required. The gum-containing concrete, in addition to its high mix workability, has a yield ratio of 1.26 if compared to standard concrete mixtures and is characterized by low shrinkage characteristics, an important economic factor.

EXAMPLE II

The table below sets forth concrete compositions of the invention which utilize liquid additive. The liquid additive consists of vegetable gum emulsified into water containing a water dispersable resin. The viscosity of the additive is further reduced by incorporating liquids such as latexes in the mix.

TABLE III

| MIX | CONCRETE COMPOSITION | VEGETABLE GUM | LIQUID + POLYMER | Q |
|---|---|---|---|---|
| CK-1 | cement: 517 lb/cu yd. water: 233lb fine aggregate: 1400 lb coarse aggregate: 1400 lb water/cement: .45 $f'_c$=2800 psi unit wt: 137 lbs/cu ft *slump: 2 inches | 25 lbs/cu yd | 80 lbs/cu yd | 48 |
| CK-2 | cement: 600 lb/cu yd. light wt. aggregate: 800 lb/cu yd. $f'_c$: 3000 psi unit weight: 110-120 lb/cu ft slump: 2.5 to 3 inches | 32 lbs/cu yd | 150 lbs/cu yd | 31–40 |
| A-1 | Same as mix CK-1 | 25 lb/cu yd | 80 lb/cu yd | 44.2 |
| A-2 | Same as mix CK-1 | 25 lb/cu yd | 80 lb/cu yd | 44.1 |
| A-3 | Same as mix CK-1 | 25 lb/cu yd | 80 lb/cu yd | 46.5 |
| A-4 | Same as mix CK-1 | 50 lb/cu yd | 50 lb/cu yd | 42.1 |
| A-5 | Same as mix CK-1 | 75 lb/cu yd | 50 lb/cu yd | 42.1 |
| A-6 | Same as mix CK-1 | 75 lb/cu yd | 50 lb/cu yd | 41.4 |
| A-7 | Same as mix CK-1 | 75 lb/cu yd | 50 lb/cu yd | 41.5 |

*ASTM test C143
+Water dispersable resin + water + latex as diluent

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A curable composition suitable for forming concrete having a high damping capacity which comprises sand, gravel, cement, vegetable gum particles coated with a water dispersible curable resin and a curing agent for said resin, said coated vegetable gum particles being present in a concentration of between about 2 and 15 weight percent based upon the total weight of the concrete composition and water in a concentration to yield a water-cement ratio of between about 0.37 and 0.45, the relative concentration of resin and curing agent being controlled to cause substantially complete curing of the resin within about the same time necessary to cause substantially complete curing of the cement composition.

2. A concrete having a high damping capacity which comprises sand, gravel, cured (hydrated) cement, and vegetable gum particles coated with a cured resin derived from a waterbased and/or dispersible resin, said coated gum particles comprising between 2 and 15 weight percent based upon the total weight of the concrete composition, said concrete composition having about a 0.37 to 0.45 water-cement ratio.

3. The composition of claim 1 wherein the vegetable gum is polymerized soya bean oil.

4. The composition of claim 2 wherein the vegetable gum is polymerized soya bean oil.

5. The composition of claim 1 wherein the concentration of coated vegetable gum particles is between about 3.0 and 6.0 weight percent.

6. The composition of claim 2 wherein the concentration of coated vegetable gum particles is between about 3.0 and 6.0 weight percent of the concrete composition.

7. The composition of claim 3 wherein the concentration of coated vegetable gum particles is between about 3.0 and 6.0 weight percent.

8. The composition of claim 4 wherein the concentration of coated vegetable gum particles is between about 3.0 and 6.0 weight percent concrete composition.

9. The process for forming a concrete composition having a high damping capacity and structurally acceptable flexural strength (400 to 800 psi) which comprises mixing sand, gravel, cement, water, and a water dispersion containing vegetable gum particles coated with a water-based and/or dispersible curable resin and a curing agent for said resin, the total concentration of water in the resultant mixture being between about 0.37 and 0.45 weight based upon the cement weight, the concentration of said coated gum particles being between about 2 and 15 weight percent based upon the total weight of the concrete composition and drying said mixture to substantially completely cure the cement and the resin.

10. The process of claim 9 wherein the vegetable gum is polymerized soya bean oil.

11. The composition of claim 1 wherein the resin is an epoxy.

12. The composition of claim 2 wherein the resin is an epoxy.

13. The composition of claim 3 wherein the resin is an epoxy.

14. The composition of claim 4 wherein the resin is an epoxy.

15. The composition of claim 5 wherein the resin is an epoxy.

16. The composition of claim 6 wherein the resin is an epoxy.

17. The composition of claim 7 wherein the resin is an epoxy.

18. The composition of claim 8 wherein the resin is an epoxy.

19. The process of claim 9 wherein the resin is an epoxy.

20. The process of claim 10 wherein the resin is an epoxy.

21. A curable concrete composition suitable for forming concrete having a high damping capacity which comprises sand, gravel, cement, water, vegetable gum particles coated with a water dispersible curable resin, the coated gum particles being present in amounts equal to between about 5 to about 100 percent of the volume of the sand in the composition, the relative concentration of resin and curing agents being controlled to cause substantial complete curing of the resin within about the same time necessary to cause substantially complete curing of the cement composition.

22. The composition as set forth in claim 21 wherein the concentration of resin and curing agent is chosen to cure the resin within the time between the range of 40 minutes to 2 hours.

23. The composition as set forth in claim 22 wherein the concentration of sand normally employed to form a concrete composition is reduced in correspondence to the concentration of coated gum particles added to the concrete composition.

24. The composition as set forth in claim 21 wherein the gum particles range in size from 5 microns to 0.25 inches.

25. A concrete composition having a high damping capacity which comprises sand, gravel, water, cement and vegetable gum particles coated with a polymerized resin, said vegetable gum particles coated with polymerized resin being present in amounts of between about 5 and about 100 percent of the volume of the sand in the composition.

26. The composition as set forth in claim 25 wherein the concentration of resin and curing agent is chosen to cure the resin within the time between the range of 40 minutes to 2 hours.

27. The composition as set forth in claim 26 wherein the concentration of sand normally employed to form a concrete composition is reduced in correspondence to the concentration of coated gum particles added to the concrete composition.

28. The composition as set forth in claim 25 wherein the gum particles range in size from 5 microns to 0.25 inches.

29. A process for forming concrete having a high damping capacity and structurally acceptable flexural strength (400–800 psi) comprising the following steps:
  mixing sand, gravel, cement, water, and a water dispersion containing vegetable gum particles coated with a water-base and/or dispersible curable resin and a curing agent for said resin said coated vegetable gum particles being added in amounts equivalent to 10 to 100 volume percent of the sand in the composition; and
  drying the mixture of step (a) to cure the cement and resin and form concrete.

30. A curable concrete composition suitable for forming concrete having a high damping capacity which comprises sand, gravel, cement, water, and vegetable gum particles coated with a water dispersible curing agent, the coated gum particles being present in amounts equal to between 20 to 50 percent of the volume of the sand in the composition, the relative concentration of resin and curing agent being controlled to cause substantially complete curing of the resin within about the same time necessary for the cement in the concrete composition to set.

31. The composition as set forth in claim 30 wherein the concentration of resin and curing agent is selected to cure the resin in 40 minutes to 2 hours.

32. The composition as set forth in claim 31 wherein the volume of sand normally employed to form a concrete composition is reduced in correspondence to the volume of coated gum particles added to the concrete composition.

33. The composition as set forth in claim 30 wherein the gum particles range in size from 5 microns to 0.25 inches.

34. The composition as set forth in claim 1 wherein the vegetable gum is polymerized soya bean oil.

35. The composition as set forth in claim 30 wherein the resin is an epoxy.

36. A concrete having a high damping capacity which comprises sand, gravel, water, hydrated cement, and vegetable gum particles coated with a polymerized resin, said vegetable gum particles coated with polymerized resin being present in amounts of between 20 to 50 percent of the volume of the sand in the composition.

37. The concrete as set forth in claim 36 wherein the volume of sand normally employed to form a concrete composition is reduced in correspondence to the volume of coated gum particles added to the concrete.

38. The concrete as set forth in claim 36 wherein the gum particles range in size from 5 microns to 0.25 inches.

39. The concrete as set forth in claim 36 wherein the vegetable gum is polymerized soya bean oil.

40. The concrete as set forth in claim 36 wherein the resin is an epoxy.

41. A curable composition suitable for forming concrete having a high damping capacity which comprises sand, gravel, cement, and between about 5 and 30 gallons per cubic yard of concrete of a liquid gum comprising a dispersion of gum particles in a polymeric liquid comprising water and solubilized hardenable resin, said composition having a water-cement ratio of between about 0.37 and 0.45.

42. The composition as set forth in claim 41 wherein between 10 and 25 gallons per cubic yard of the composition comprises said dispersion.

43. The composition as set forth in claim 41 wherein the dispersion includes latex.

44. The composition as set forth in claim 41 wherein the vegetable gum is polymerized soya bean oil.

45. A concrete having a high damping capacity which comprises sand, gravel, cured (hydrated) cement, latex, and vegetable gum particles secured to and within the concrete by a hardened polymeric liquid comprising a cured water dispersable resin, said gum particles, latex, and polymeric liquid together comprising between about 1 and 20 weight percent based upon the total weight of the concrete composition, said concrete composition having about a 0.37 to 0.45 total water-cement ratio.

* * * * *